(12) United States Patent
Smith

(10) Patent No.: US 6,950,569 B2
(45) Date of Patent: Sep. 27, 2005

(54) NON-LINEAR SPRING FORCE SWITCH ASSEMBLY

(75) Inventor: Dennis W. Smith, Phoenix, AZ (US)

(73) Assignee: Honeywell International Inc., Morristown, NJ (US)

( * ) Notice: Subject to any disclaimer, the term of this patent is extended or adjusted under 35 U.S.C. 154(b) by 149 days.

(21) Appl. No.: 10/647,969

(22) Filed: Aug. 25, 2003

(65) Prior Publication Data

US 2005/0047709 A1 Mar. 3, 2005

(51) Int. Cl.$^7$ ................................................. G02B 6/26
(52) U.S. Cl. .......................................... 385/16; 385/18
(58) Field of Search ............................... 385/16–24, 33, 385/36, 46, 47

(56) References Cited

U.S. PATENT DOCUMENTS

| 3,642,344 A | 2/1972 | Corker |
| 5,999,669 A | * 12/1999 | Pan et al. ...................... 385/18 |

FOREIGN PATENT DOCUMENTS

| DE | 19824537 A | 12/1999 |
| DE | 10003930 C | 6/2001 |
| EP | 0381983 A | 8/1990 |
| EP | 0660255 A | 6/1995 |
| GB | 1572229 A | 7/1980 |
| WO | WO03/064315 A | 8/2003 |

* cited by examiner

Primary Examiner—Phan T. H. Palmer

(57) ABSTRACT

A switch assembly includes an arm assembly, a primary spring, one or more secondary springs, and a latch assembly. The arm assembly is configured to rotate between at least a first rotational position and a second rotational position. The primary spring is coupled to the arm assembly and is configured to bias the arm assembly toward a third rotational position that is located between the first and second rotational positions. Each secondary spring is disposed in the switch assembly and is configured to selectively bias the arm assembly toward the third rotational position when the arm assembly reaches a predetermined rotational distance from either the first or second rotational positions. The latch assembly is disposed in the switch assembly and is operable to selectively hold the arm assembly in either the first or second rotational positions, and to selectively release the arm assembly from the rotational position in which it is holding the arm assembly.

27 Claims, 5 Drawing Sheets

NON-LINEAR SPRING FORCE SWITCH ASSEMBLY

CROSS-REFERENCE TO RELATED APPLICATIONS

The present application is related to U.S. patent application Ser. No. 10/103,534, entitled HIGH SPEED OPTICAL ELEMENT SWITCHING MECHANISM, filed Mar. 20, 2002, and U.S. patent application Ser. No. 10/636,718, entitled BI-STABLE MAGNETIC LATCH, filed Aug. 6, 2003, both of which are assigned to the Assignee of the present application.

TECHNICAL FIELD

The present invention relates to an optical element switch and, more particularly, to a non-linear spring force mechanism that may be used to improve high speed switching of a switch assembly.

BACKGROUND

Various systems and devices such as, for example, optical test instruments and equipment, include one or more optical elements, which may be provided to implement, for example, optical filtering. In some of these systems, it may be desirable to simultaneously switch one or more optical elements into and out of an optical path. Preferably, this optical element switching operation is performed relatively rapidly.

In the past, rapid and simultaneous optical element switching has been accomplished using, for example, a wheel mechanism that is configured to rotate the optical elements into and out of the optical path. In one exemplary wheel mechanism embodiment, the optical elements are arranged around the perimeter of a wheel. As different optical elements are to be moved into and out of the optical axis, a motor or other driver rotates the wheel, stopping when the desired optical element is in the optical path.

Although wheel mechanisms generally operate safely, these mechanisms also suffer certain disadvantages. For example, the configuration of many of these wheel mechanisms provides for sequential, rather than random, access to the elements at the edges of the wheel. As a result, the amount of time and energy that may be used to switch one element into the optical path and another optical element out of the optical path can be undesirably high. This may be most pronounced when the wheel is used to move optical elements into and out of the optical path that are located on opposite sides of the wheel.

Another drawback of some known wheel mechanisms is that rapid movement of the wheel can cause disturbances in the system. These disturbances can result in, for example, image blur. This can be a significant factor in applications that implement precise optical system control such as, for example, in satellite applications. To compensate for the disturbances a rapidly moving wheel may cause, some systems may implement long settling periods after wheel movement. Other systems may use complex force compensation and/or isolation mechanisms, which can increase the system complexity and, in some cases, simultaneously decrease system reliability. Moreover, some of these complex mechanisms may also dissipate significant power, which can negatively impact the thermal profile of the system.

To overcome one or more of the above-noted drawbacks, switch assemblies, such as those disclosed in the applications cross-referenced above, have been developed. These switch assemblies also operate safely and reliably, yet suffer additional drawbacks. In particular, each of the switch assemblies disclosed in these applications rotates via a spring biased pivot mechanisms, such as a torsion bar spring, and is magnetically latched in one of two rotational positions. The strength of the magnetic field that is used to overcome the torsion bar spring force and pull the switch into a latched position may be of such a magnitude that a relatively high latching force is applied to the switch assembly. This can create comparatively high contact forces, which can result in unwanted shock and vibrations upon latching. In addition, substantial power may be needed to overcome the magnetic force to disengage the switch assembly from a latched position.

Hence, there is a need for a switch assembly that addresses one or more of the above-noted drawbacks. Namely, a switch assembly that does not generate latching forces that result in unduly high shock and vibration, and/or a switch assembly that uses less power to release the switch from a latched position The present invention addresses one or more of these needs.

BRIEF SUMMARY

The present invention provides switch assembly that may be used, for example, to rapidly switch one or more optical elements into and out of an optical path. Compared to known switch assemblies, the presently disclosed switch assembly reduces the amount of shock and vibration that may be generated when latched, and uses less power to release it from a latched position.

In one embodiment, and by way of example only, a switch assembly includes an arm assembly, a primary spring, one or more secondary springs, and a latch assembly. The arm assembly is configured to rotate between at least a first rotational position and a second rotational position. The primary spring is coupled to the arm assembly and is configured to bias the arm assembly toward a third rotational position that is located between the first and second rotational positions. Each secondary spring is disposed in the switch assembly and is configured to selectively bias the arm assembly toward the third rotational position when the arm assembly reaches a predetermined rotational distance from either the first or second rotational positions. The latch assembly is disposed in the switch assembly and is operable to (i) selectively hold the arm assembly in either the first or second rotational positions and (ii) selectively release the arm assembly from the rotational position in which it is holding the arm assembly.

In yet another exemplary embodiment, a switch assembly includes a rotor, an arm, a primary spring, a secondary spring, and a latch assembly. The rotor is configured to rotate between at least a first rotational position and a second rotational position. The arm is coupled to the rotor and extends axially therefrom. The primary spring is coupled to the rotor and is configured to bias the rotor toward a third rotational position that is located between the first and second rotational positions. Each secondary spring is disposed in the switch assembly and is configured to selectively bias the rotor toward the third rotational position when the rotor reaches a predetermined rotational distance from either the first or second rotational positions. The latch assembly is disposed in the switch assembly and is operable to (i) selectively hold the rotor in either the first or second rotational positions and (ii) selectively release the rotor from the rotational position in which it is holding the rotor.

The foregoing and other objects, features and advantages of the preferred switch assembly will be apparent from the following more particular description of a preferred embodiment of the invention, as illustrated in the accompanying drawings.

BRIEF DESCRIPTION OF THE DRAWINGS

The preferred exemplary embodiment of the present invention will hereinafter be described in conjunction with the appended drawings, where like designations denote like elements, and.

DETAILED DESCRIPTION

The following detailed description is merely exemplary in nature and is not intended to limit the invention or the application and uses of the invention. Furthermore, there is no intention to be bound by any expressed or implied theory presented in the preceding technical field, background, brief summary or the following detailed description.

Figure 1:
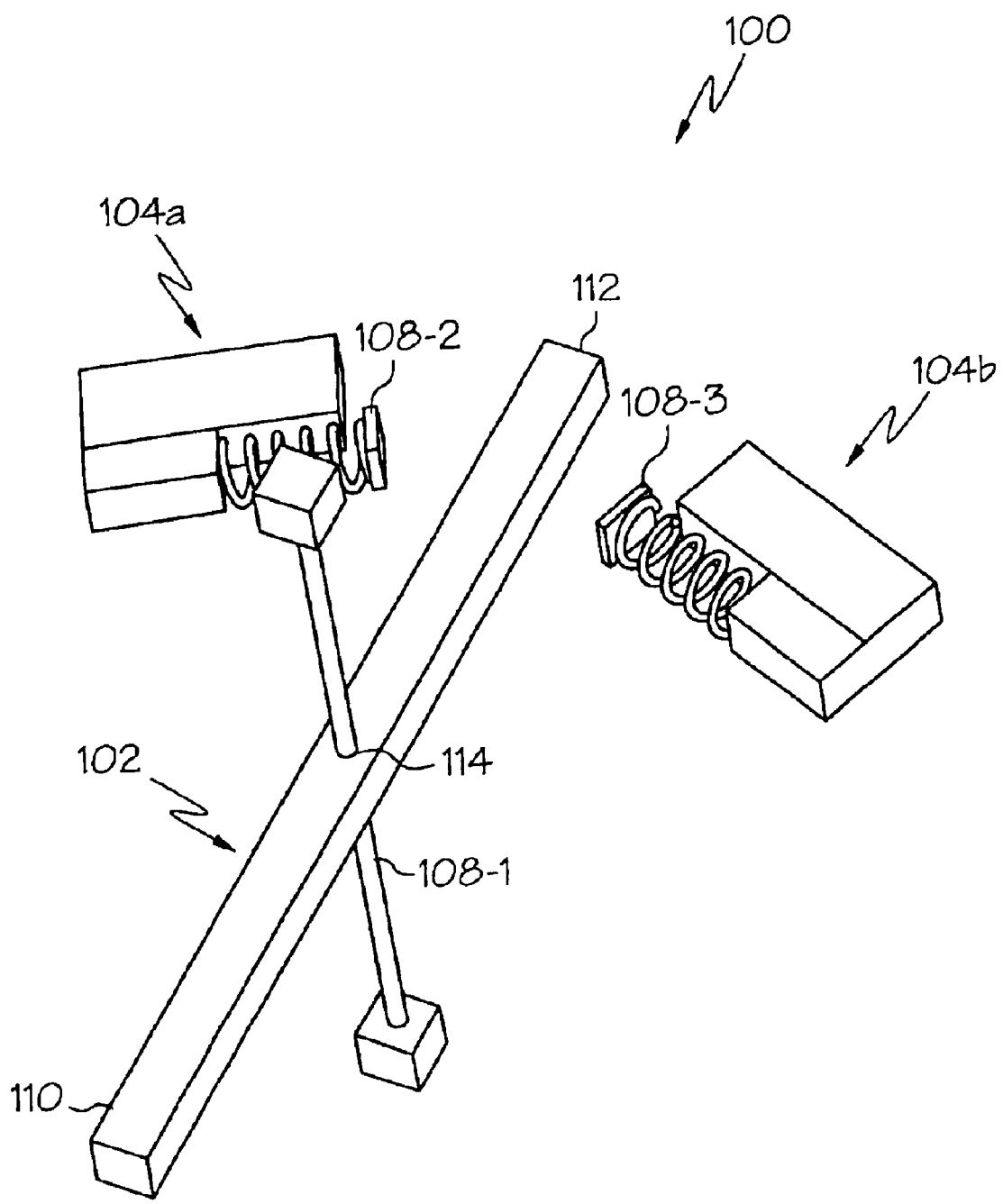
FIG. 1 is a perspective view of a switch assembly according to an exemplary first embodiment.

Turning now to FIG. 1, a simplified perspective view of switch assembly 100 according to one exemplary embodiment is shown. The switch assembly 100 includes an arm assembly 102, a plurality of arm latch assemblies 104, and a plurality of springs 108. The arm assembly 102 includes a first end 110 and a second end 112, and is adapted to be rotationally coupled to one or more non-illustrated mount structures at a position 114 between the first 110 and second 112 ends. In the depicted embodiment, the arm assembly 102 may be mounted to one or more mount structures, which may be disposed on opposite sides of the arm assembly 102 (e.g., above and below in the view of FIG. 1). It will be appreciated that the arm assembly 102 could also be configured to mount to only a single mount structure. Moreover, an optical element (not illustrated) may be coupled to the arm first end 110 and may be moved into and out of a non-illustrated optical path that extends through each mount structure. An exemplary mount structure and optical path are disclosed in co-pending U.S. application Ser. No. 10/103,534, entitled HIGH SPEED OPTICAL ELEMENT SWITCHING MECHANISM, filed Mar. 20, 2002, which is assigned to the Assignee of the present application, and the entirety of which is hereby incorporated by reference The arm assembly 102 may be any one of numerous structural members to which an optical element may be coupled. Preferably, the arm 102 is constructed with sufficient rigidity to effectively control the position of the optical element as the arm 102 rotates. Moreover, as will be discussed more fully below, at least a portion of the arm 102 is preferably made of either a magnetically permeable material or a material that is permanently magnetized. It will be further appreciated that any one of numerous devices may be used to rotationally couple the arm 102 to a mount structure. Non-limiting examples of such devices include flex pivots, bearings, and flexural elements.

The arm latch assemblies 104, which in the embodiment depicted in FIG. 1 include a first arm latch assembly 104a and a second arm latch assembly 104b, are each coupled to the mount structure 114, respectively, at first and second mount positions It is noted that these first and second mount positions substantially coincide with first and second rotational positions, respectively, of the arm 102. As is described in more detail further below, the first and second arm latch assemblies 104a, 104b are configured to selectively hold the arm 102 in either the first or second rotational position. It will be appreciated that the first and second rotational positions may be any one of numerous rotational positions, which may be selected to meet the requirements of the system into which the switch assembly 100 is installed.

Figure 2:
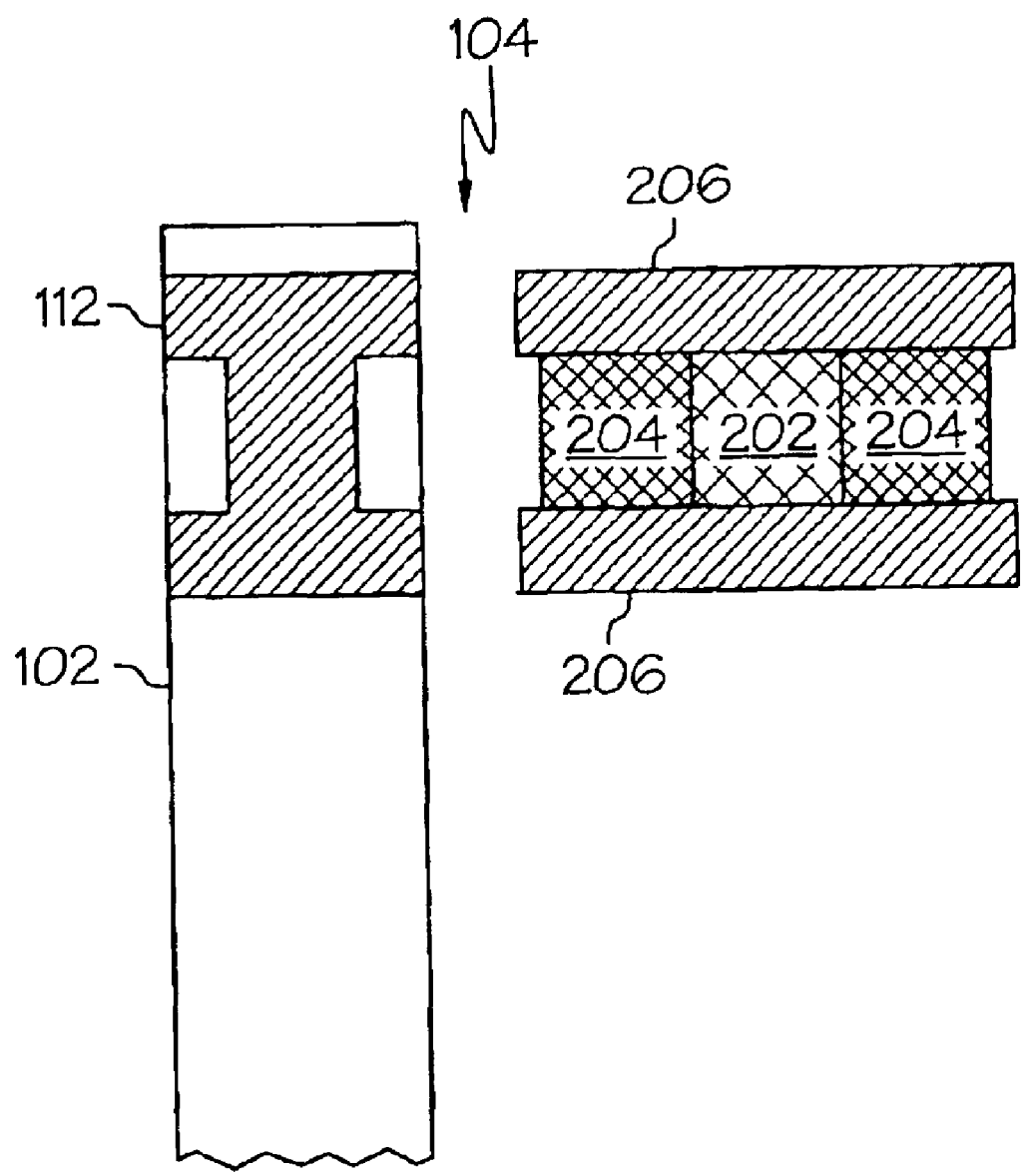
FIG. 2 is a cross-section view of an exemplary latch assembly that may be used with the switch assembly depicted in FIG. 1.

The first and second arm latch assemblies 104a, 104b may be any one of numerous known devices that are operable to selectively hold the arm 102 in one of the two rotational positions and, in some embodiments, to supply additional rotational energy to the arm 102 to commence, or complete, its rotation, or to both commence and complete its rotation The arm latch assemblies 104a, 104b may be either mechanical, electromagnetic, or magnetic devices, or a combination of both. The arm latch assemblies 104a, 104b will preferably hold the arm 102 with little or no power consumption, and will preferably supply at least some energy to make up for losses. One particular preferred embodiment of an arm latch assembly 104 is shown in FIG. 2, and will now be described. Before doing so, however, it will be appreciated that, although FIG. 1 depicts a spring 108 coupled to each arm latch assembly, the arm latch assembly is, for clarity, depicted and described without any springs.

In the particular embodiment shown in FIG. 2, the arm latch assembly 104 includes a permanent magnet 202, an electromagnetic coil 204, and a case 206. The coil 204 is wrapped around the permanent magnet 202, both of which are housed within the case 206. The case 206 is preferably constructed of a magnetically permeable material such as, for example, iron, to complete a magnetic flux path. With this particular embodiment, the permanent magnet 202 is used to hold the arm 102 in either the first or second rotational position. To release the arm 102, an electrical pulse is supplied to the coil 204. The supplied pulse is of an appropriate polarity, magnitude, and duration to cause the coil 204 to generate a magnetic field having a magnitude and direction sufficient overcome the magnetic force of the permanent magnet 202, thereby releasing the arm 102. It will be appreciated that with this particular arm latch embodiment, that the arm 102 is at least partially constructed of a magnetically permeable material such as, for example, iron. In a particular preferred embodiment, at least a portion of the arm second end 112 may be constructed to include iron (or other magnetically permeable material), so as to additionally function as a counter-weight to balance another components, such as an optical element, that may be coupled to the arm first end 110.

It will be appreciated that the embodiment described above and depicted in FIG. 2 is merely exemplary, and that other configurations could be used. For example, the permanent magnet 202 could be placed on the arm 102 proximate the second end 112, with only the coil 204 being disposed in the case 206. With this configuration, no power is again needed to hold the arm 102 in either the first or second rotational positions. However, with this configuration, when the electrical pulse is supplied to the coil 204, the arm 102 would be pushed as it is released, supplying energy to the arm 102 in addition to that supply by the springs 108. The pulse could be supplied until the arm 102 reaches the other rotational position and is held in place by the permanent magnet 206. It will be appreciated that this alternative embodiment minimizes disturbances, and provides sufficient time for certain structural modes in the arm 102 and springs 108 to settle. In other words, the energy supplied to the arm 102, upon release, excites the arm 102. This excitation settles as the arm 102 moves from one rotational position to the other, but is not re-excited by, for example, slamming into the opposite arm latch assembly 104, since the arm 102 is stopped by simple harmonic motion and then is held in place.

Returning now to FIG. 1, as was previously noted the switch 100 includes a plurality of springs 108. In the depicted embodiment, the switch 100 includes three springs, a primary spring 108-1, and two secondary springs 108-2 and 108-3, each of which is configured to bias the arm 102 toward a rotational position between the first and second rotational positions, when the primary 108-1 and secondary 108-2, 108-3 springs 108-3 are coupled to the arm 102. The primary spring 108-1 is coupled to the arm 102 substantially continuously, while the secondary springs 108-2, 108-3 are selectively coupled to, and decoupled from, the arm 102 at rotational positions relative to the first and second rotational positions. In the depicted embodiment, the primary spring 108-1 is a torsion bar spring and is used to rotationally mount the arm 102 to the mount structure 114, and the secondary springs 108-2, 108-3 are coil springs. It will be appreciated that although the embodiment depicted in FIG. 1 includes two secondary springs 108-2, 108-3, the switch 100 could also include up to N-number of secondary springs 108-2, 108-3, 108-4, . . . 108-N. It will additionally be appreciated that the springs 108 may be any one of numerous spring structures that provide sufficient energy to move and/or slow the arm 102 within desired time and distance constraints. Non-limiting examples include coil springs, helical springs, torsion springs, leaf springs, and translational tension or compression springs.

It is noted that the primary spring 108-1 is preferably configured such that it, and thus the arm 102, has a neutral position that is substantially centered between the arm latch assemblies 104. It will be appreciated that the present embodiment is not limited to this position, but is merely exemplary of the preferred position. It is additionally noted that the spring constant of the primary spring 108-1 is preferably less than the spring constant of other the secondary springs 108-2, 108-3, 108-4, . . . 108-N. The reason for this will become more apparent from the following discussion.

Figure 3:
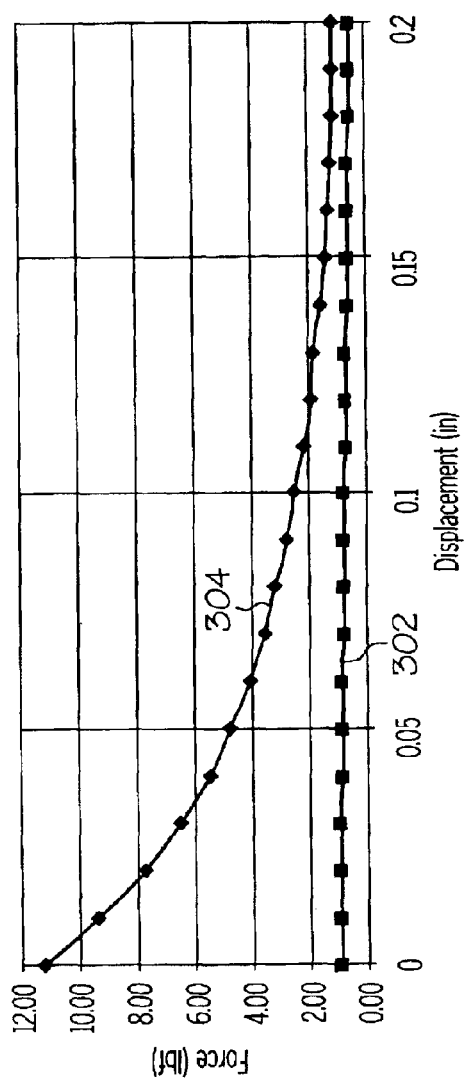
FIG. 3 is a graph showing the force versus displacement characteristics of a magnetic field and a single spring.
Figure 4:
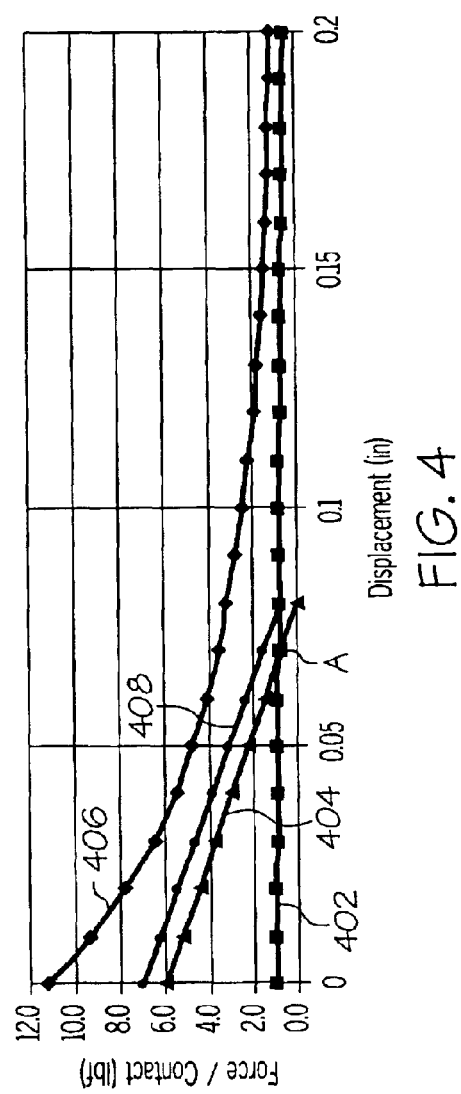
FIG. 4 is a graph showing the force versus displacement characteristics of a magnetic field, and two springs, both individually and in combination with one another.

As is generally known, and as depicted in FIG. 3, the force versus displacement characteristic of a spring 302 is linear, whereas the force versus displacement characteristic of a magnetic field 304 is non-linear. Thus, if the switch assembly 100 included only the primary spring 108-1, as the arm assembly 102 approached one of the latch assemblies 104 the difference in magnitude between the spring force and magnetic force would result in a significant latching force being exerted on the arm assembly 102. This can potentially result in unwanted vibrations and/or damage. Moreover, this relatively large latching force must be overcome in order to release the arm assembly 102 from the latched position. By adding the secondary springs 108-2, 108-3, 108-4, . . . 108-N, and selecting the particular spring constant values for both the primary 108-1 and secondary 108-2, 108-3, 108-4, . . . 108-N springs, these potential drawbacks can be minimized or substantially eliminated. Specifically, the particular spring constant values are chosen so that the springs 108-1, 108-2, 108-3, . . . 108-N, in combination, will exhibit a force versus distance characteristic that more closely approximates that of the arm latch assemblies 104. This is illustrated most clearly in FIG. 4, which illustrates the force versus distance characteristics for an arm assembly 102 with a secondary spring 108 that is selectively coupled to the arm assembly 102 as it approaches either the first or second rotational position. The force versus distance characteristics of the primary and secondary springs 402 and 404, respectively, are linear, and the force versus distance characteristic of a magnetic field 406 is non-linear. However, because the secondary spring is not coupled to the arm assembly 102 until it reaches point (A), the total force versus distance characteristic of the springs 408, more closely approximates that of the magnetic field force 406 exerted by the arm latch assembly 104. As a result, when the arm 102 is latched in either the first or second rotational position, it will do so with both a reduced contact and holding force, as compared to a switch 100 without the added springs.

During operation of the switch assembly 100, the arm latch assemblies 104a, 104b hold the arm 102 in either the first or second the rotational position until it is desired to move the arm 102 to the other rotational position For example, if the first arm latch assembly 104a is holding the arm 102 in the first rotational position, and it is desired to move the arm 102 to the second rotational position, the first arm latch assembly 104a is configured to release the arm second end 116. Upon release of the arm second end 112, the force supplied by the primary and secondary springs 108-1, 108-2 causes the arm 102 to begin rotating toward the second rotational position. At some point after the arm 102 begins rotating, the secondary spring 108-2 is decoupled from the arm 102. The primary spring 108-1 remains coupled to the arm 102 throughout its rotation, and supplies energy to the arm 102, until the arm 102 passes through the neutral point of the primary spring 108-1. As was noted above, this neutral point is preferably substantially midway between the first and second rotational positions. When rotation of the arm 102 passes through the neutral point, the arm 102 begins transferring its rotational kinetic energy to the primary spring 108-1, and thus its rotation begins to slow. As the arm 102 approaches the second rotational position, or at some point in time before this, the second arm latch assembly 104b is configured in such a manner as to supply additional energy to the arm 102 to complete its rotation to the second rotational position. In addition, at some point before the arm 102 reaches the second rotational position, the other secondary spring 108-3 is coupled to the arm 102. When the arm 102 reaches the second rotational position, the second arm latch assembly 104b holds the arm 102 in this position.

The above-described switch assembly 100 can be implemented in a system that includes multiple switch assemblies 100, so that multiple optical elements can be switched into and out of an optical path. An exemplary embodiment of one such system is depicted and described in the above-noted U.S. patent application Ser. No. 10/103,534, the entirety of which was incorporated by reference. It is additionally noted that the above-described switch assembly embodiment 100 is merely exemplary of one particular simplified embodiment, and that additional embodiments may be implemented. Indeed, the remaining portion of this description will provide a detailed description of two particular alternative embodiments.

Figure 5:
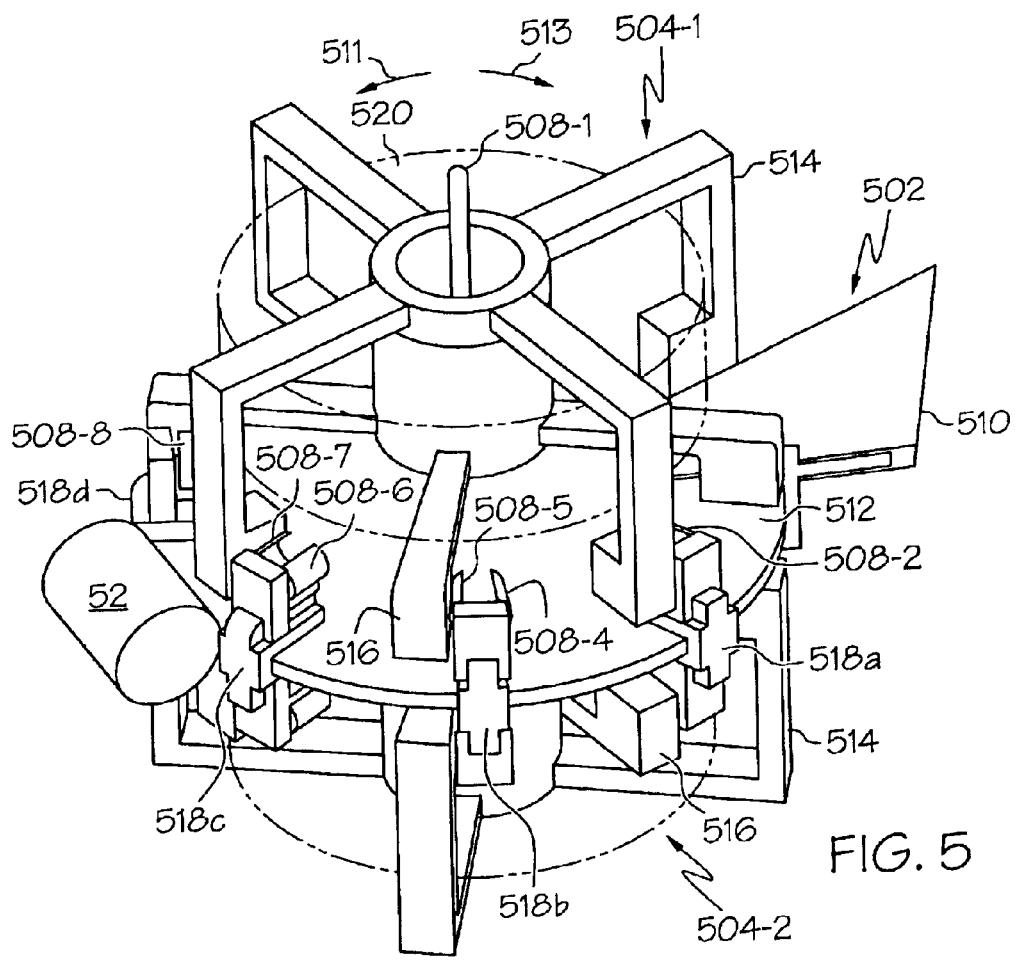
FIG. 5 is a perspective view of a switch assembly according to an exemplary alternative embodiment.
Figure 6:
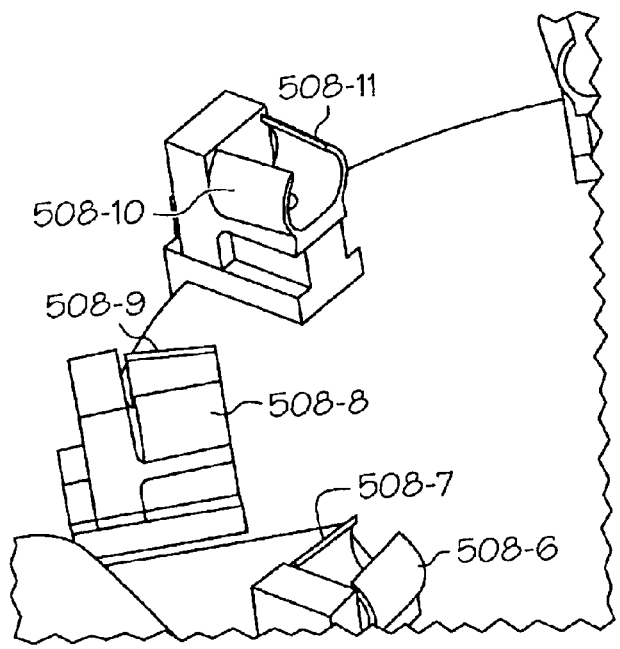
FIG. 6 is a perspective close up view of a portion of the switch assembly depicted in FIG. 5, with the switch assembly in a partially assembled condition.

With reference now to FIGS. 5 and 6, the first of these alternative embodiments will now be described. As with the previous embodiment, the switch assembly 500 includes an arm assembly 502, a plurality of arm latch assemblies 504, and a plurality of springs 508. As can be seen, the configuration and/or physical implementation of one or more of these particular components or assemblies differs from the previous embodiment. In particular, the arm assembly 502 includes not only an arm 510, but also includes a rotor 512. The arm 510 is coupled to the rotor 512, which is configured to rotate in first and second rotational directions 511, 513. In the depicted embodiment, the rotor 512 includes eight poles 518a–h (only four visible in FIG. 5), which are preferably evenly spaced around the rotor 512. A counterweight 521 is coupled to the rotor 512 at a position that is generally opposite the arm 510. Although the depicted embodiment includes eight poles 518a–h, it will be appreciated that more or less than this number of poles 518 may be used.

As in the prior embodiment, a non-illustrated optical element may be coupled to the arm 510 proximate one of its ends. Thus, the arm 510, via its rotation between the first and second rotational positions, may be used to move the optical element into and out of, respectively, a non-illustrated optical axis. The arm assembly 502, or at least the poles 518a–h of the arm assembly 502, is preferably at least partially formed of a material that is permanently magnetized.

Turning now to a description of the arm latch assemblies 504, it is seen that the switch assembly 500 includes at least two latch assemblies 504, an upper latch assembly 504-1 and a lower latch assembly 504-2. The upper 504-1 and lower 504-2 arm latch assemblies are each preferably mounted against rotation. Each of the latch assemblies 504 includes outer pole pieces or "spiders" 514, inner pole pieces or "spiders" 516, and an electromagnetic coil 520. Each of the pole pieces 514, 516 includes a number of poles, which preferably matches the number of rotor poles 518. With this configuration, when the permanent magnets on each rotor pole 518 contact the inner 516 and outer 514 pole pieces, a magnetic circuit is formed. As a result, the latch assemblies 504 may hold the arm assembly 502 in one of two (e.g., a first or a second) rotational positions. To release the arm assembly 502 from one of the rotational positions, an electrical pulse is supplied to the electromagnetic coil 520. The magnitude, duration, and polarity of the pulse results in a magnetic field being generated that is sufficient, in combination with the force supplied from the springs 508, to overcome the permanent magnets. It will be appreciated that the arm latch assembly 504 configuration depicted in FIG. 5 is merely exemplary, and that numerous other configurations could be used.

The plurality of springs 508 include a primary spring 508-1 and sixteen secondary springs 508-2, 508-3, 508-4, . . . 508-17 per latch assembly 504, for a total of thirty-two secondary springs. As with the prior embodiment, the primary spring 508-1 is configured to continuously bias to the arm assembly 502 toward a third rotational position between the first and second rotational positions, and the secondary springs 508-2, 508-3, 508-4, . . . 508-17 are each configured to selectively bias the arm assembly 502 toward the third rotational position. The primary spring 508-1, as with the first switch assembly 100, is preferably a torsion bar spring and is used to rotationally mount the rotor 512 to a mount structure. It will be appreciated, however, that the switch assembly 500 could be implemented with a separate shaft, to which the primary spring 508-1 is continuously coupled.

As shown most clearly in FIG. 6, which is a close up view of a section of FIG. 5 with the switch assembly 500 in a partially assembled state, the secondary springs 508-2, 508-3, 508-4, . . . 508-17 are each coupled to, and extend from one side of, one of the rotor poles 518. Thus, the secondary springs 508-2, 508-3, 508-4, . . . 508-17 are selectively coupled to, and decoupled from, the stator assembly pole pieces 514, 516 at rotational positions relative to the first and second rotational positions of the arm assembly 502. It will be appreciated that one secondary spring 508-2, 508-3, 508-4, . . . 508-17 per each side of a rotor pole 518 is merely exemplary, and that N-number of secondary springs per pole side could be used. It will additionally be appreciated that the leaf springs depicted in FIGS. 5 and 6 are merely exemplary, and that numerous other springs structures could be used. Moreover, although the secondary springs in the depicted embodiment are configured such that two secondary springs form a single assembly that is coupled to a rotor pole 518, it will be appreciated that each secondary spring could be individually formed and coupled to a rotor pole 518.

Figure 7:
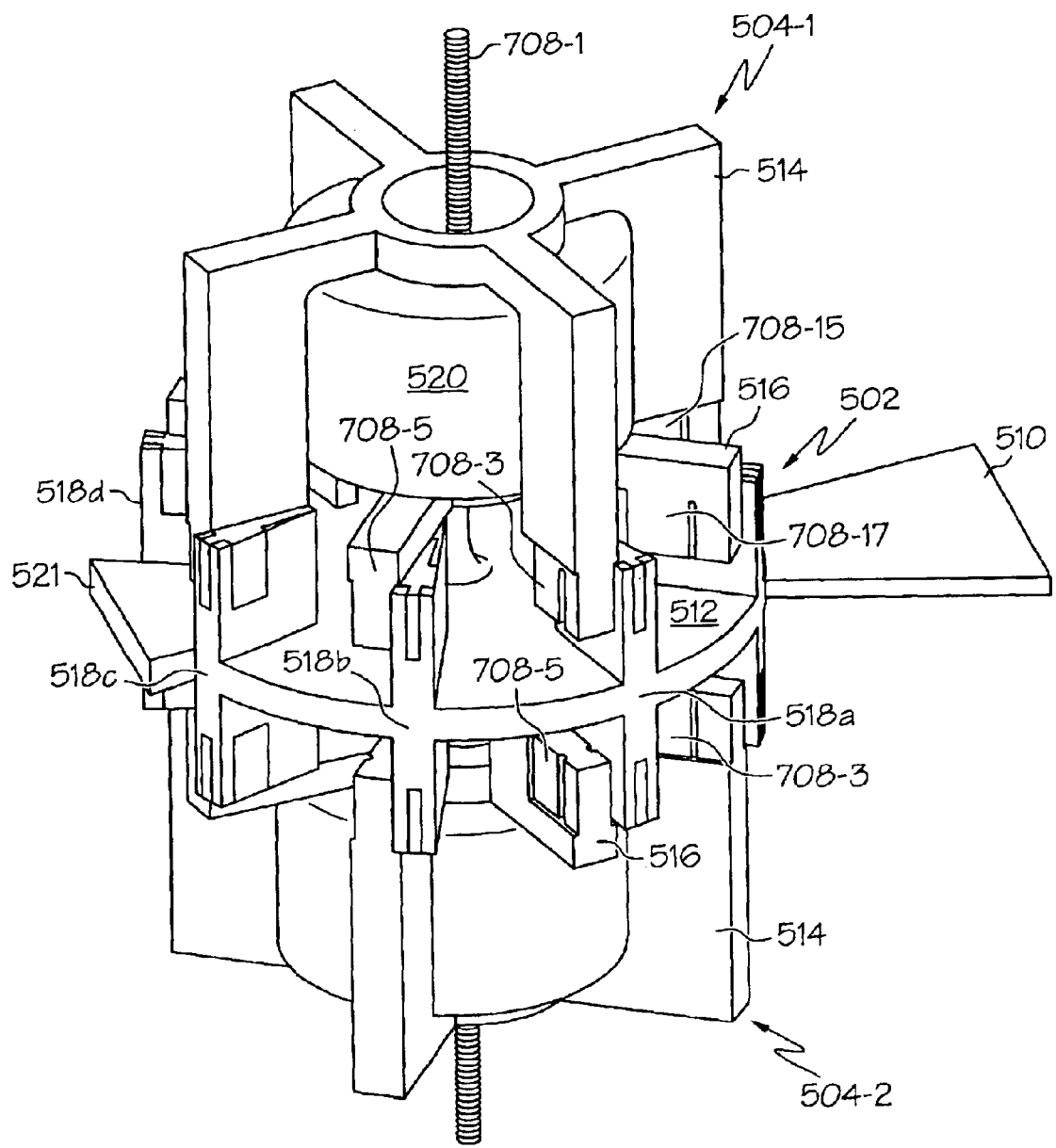
FIG. 7 is a perspective view of a switch assembly according to yet another exemplary embodiment.

One other alternative switch assembly, which is depicted in FIG. 7, will now be described. This switch assembly 800 is constructed substantially similar to the one depicted in FIGS. 5 and 6 and described immediately above, with the exception of the configuration of the secondary springs. Hence, a detailed description of this switch assembly will not be provided. However, it should be appreciated that like reference numerals in FIG. 7 refer to like components of FIGS. 5 and 6.

Turning now to the differences, it is seen that the switch assembly 700 depicted in FIG. 8 includes a primary spring 708-1 and sixteen secondary springs 708-2, 708-3, 708-4, . . . 708-17 per latch assembly 514. Eight of the secondary springs 708 are coupled to the upper stator assembly pole pieces 514, and the other four are coupled to the lower stator assembly pole pieces 516. Thus, the spring assemblies 708 are selectively coupled to, and decoupled from, the rotor poles 518 at rotational positions relative to the first and second rotational positions of the rotor 512. Again, it will be appreciated that N-number of springs per stator pole could be used.

While at least one exemplary embodiment has been presented in the foregoing detailed description, it should be appreciated that a vast number of variations exist. It should also be appreciated that the exemplary embodiment or exemplary embodiments are only examples, and are not intended to limit the scope, applicability, or configuration of the invention in any way. Rather, the foregoing detailed description will provide those skilled in the art with a convenient road map for implementing the exemplary embodiment or exemplary embodiments. It should be understood that various changes can be made in the function and arrangement of elements without departing from the scope of the invention as set forth in the appended claims and the legal equivalents thereof.

What is claimed is:

1. A switch assembly, comprising:
    an arm assembly configured to rotate between at least a first rotational position and a second rotational position,
    a primary spring coupled to the arm assembly and configured to bias the arm assembly toward a third rotational position that is located between the first and second rotational positions;
    one or more secondary spring disposed in the switch assembly, each secondary spring configured to selectively bias the arm assembly toward the third rotational position when the arm assembly reaches a predetermined rotational distance from either the first or second rotational positions; and a latch assembly disposed in the switch assembly and operable to (i) selectively hold the arm assembly in either the first or second rotational positions and (ii) selectively release the arm assembly from the rotational position in which it is holding the arm assembly.

2. The switch assembly of claim 1, wherein the arm assembly comprises:

a rotor adapted to be rotationally mounted and configured to rotate between at least the first and second rotational positions; and an arm coupled to the rotor and extending axially therefrom.

3. The switch assembly of claim 2, wherein:

the latch assembly comprises:
a first stator assembly including two or more pole pieces, and
a second stator assembly including two or more pole pieces; and the rotor is disposed between the first and second stator and comprises:
two or more rotor magnets coupled thereto and positioned such that, in the first and second rotational positions, each rotor magnet forms a magnetic circuit with one of the first stator poles and one of the second stator poles.

4. The switch assembly of claim 3, wherein each of the secondary springs is coupled to one of the rotor magnets.

5. The switch assembly of claim 3, wherein each of the secondary springs is coupled to one of the first stator assembly poles or to one of the second stator assembly poles.

6. The switch assembly of claim 3, wherein the latch assembly further comprises:

a coil disposed proximate at least one of the first and second stator assemblies, the coil adapted to receive an electrical signal, whereby a magnetic field is generated.

7. The switch assembly of claim 1, further comprising:

a shaft assembly coupled to the arm assembly and to the primary spring, whereby the arm assembly is configured to rotate.

8. The switch assembly of claim 7, wherein the shaft assembly and primary spring are integrally formed.

9. The switch assembly of claim 8, wherein the shaft assembly comprises a torsion bar spring.

10. The switch assembly of claim 1, further comprising:

one or more additional secondary springs disposed in the switch assembly, each additional secondary spring adapted to selectively bias the arm assembly toward the third rotational position when the arm assembly reaches a predetermined rotational distance from either the first or second rotational positions that is different from the predetermined rotational distance of the other secondary springs.

11. The switch assembly of claim 1, wherein:

the primary spring and one or more of the secondary springs each cause the arm to rotate toward the second rotational position when the latch assembly releases the arm assembly from the first position; and the primary and one or more of the secondary springs each cause the arm to rotate toward the first rotational position when the latch assembly releases the arm assembly from the second rotational position.

12. The switch assembly of claim 1, wherein each secondary spring no longer biases the arm assembly when:

(1) the arm subsequently moves in a direction opposite to that which it was moving when each secondary spring biased the arm assembly; and (2) the arm assembly is substantially at the predetermined rotation distance.

13. The switch assembly of claim 1, wherein each secondary spring is configured to selectively engage and disengage the arm assembly.

14. The switch assembly of claim 1, wherein each secondary spring is coupled to the arm assembly and configured to selectively engage and disengage the latch assembly.

15. A switch assembly, comprising:

a rotor configured to rotate between at least a first rotational position and a second rotational position; and an arm coupled to the rotor and extending axially therefrom;

a primary spring coupled to the rotor and configured to bias the rotor toward a third rotational position that is located between the first and second rotational positions;

one or more secondary spring disposed in the switch assembly, each secondary spring configured to selectively bias the rotor toward the third rotational position when the rotor reaches a predetermined rotational distance from either the first or second rotational positions; and a latch assembly disposed in the switch assembly and operable to (i) selectively hold the arm assembly in either the first or second rotational positions and (ii) selectively release the arm assembly from the rotational position in which it is holding the arm assembly.

16. The switch assembly of claim 15, wherein:

the latch assembly comprises:
a first stator assembly including two or more pole pieces, and
a second stator assembly including two or more pole pieces; and the rotor is disposed between the first and second stator and comprises:
two or more rotor magnets coupled thereto and positioned such that, in the first and second rotational positions, each rotor magnet forms a magnetic circuit with one of the first stator poles and one of the second stator poles.

17. The switch assembly of claim 16, wherein each of the secondary springs is coupled to one of the rotor magnets.

18. The switch assembly of claim 16, wherein each of the secondary springs is coupled to one of the first stator assembly poles or to one of the second stator assembly poles.

19. The switch assembly of claim 16, wherein the latch assembly further comprises:

a coil disposed proximate at least one of the first and second stator assemblies, the coil adapted to receive an electrical signal, whereby a magnetic field is generated.

20. The switch assembly of claim 15, further comprising:

a shaft assembly coupled to the rotor and to the primary spring, whereby the rotor is configured to rotate.

21. The switch assembly of claim 20, wherein the shaft assembly and the primary spring are integrally formed.

22. The switch assembly of claim 21, wherein the shaft assembly comprises a torsion bar spring.

23. The switch assembly of claim 15, further comprising:

one or more additional secondary springs disposed in the switch assembly, each additional secondary spring adapted to selectively bias the rotor toward the third rotational position when the rotor reaches a predetermined rotational distance from either the first or second rotational positions that is different from the predetermined rotational distance of the other secondary springs.

24. The switch assembly of claim 15, wherein:

the primary spring and one or more of the secondary springs each cause the arm to rotate toward the second rotational position when the latch assembly releases the arm assembly from the first position; and the primary and one or more of the secondary springs each cause the arm to rotate toward the first rotational position when the latch assembly releases the arm assembly from the second rotational position.

25. The switch assembly of claim 15, wherein each secondary spring no longer biases the arm assembly when:

(1) the arm subsequently moves in a direction opposite to that which it was moving when each secondary spring biased the arm assembly; and (2) the arm assembly is substantially at the predetermined rotation distance.

26. The switch assembly of claim 15, wherein each secondary spring is configured to selectively engage and disengage the rotor.

27. The switch assembly of claim 15, wherein each secondary spring is coupled to the rotor and configured to selectively engage and disengage the latch assembly.

* * * * *